United States Patent
Willis et al.

(10) Patent No.: US 9,528,703 B2
(45) Date of Patent: Dec. 27, 2016

(54) MICRO-MIXER FUEL PLENUM AND METHODS FOR FUEL TUBE INSTALLATION

(71) Applicant: General Electric Company, Schenectady, NY (US)

(72) Inventors: Christopher Paul Willis, Pickens, SC (US); Patrick Benedict Melton, Horseshoe, NC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 14/032,225

(22) Filed: Sep. 20, 2013

(65) Prior Publication Data
US 2015/0082806 A1 Mar. 26, 2015

(51) Int. Cl.
*F02C 7/32* (2006.01)
*B23K 1/00* (2006.01)
*F23R 3/28* (2006.01)

(52) U.S. Cl.
CPC ............ *F23R 3/286* (2013.01); *B23K 1/0018* (2013.01); *F23R 3/283* (2013.01); *F23R 2900/00017* (2013.01); *F23R 2900/00018* (2013.01)

(58) Field of Classification Search
CPC .................... F23R 3/283; F23R 3/286
See application file for complete search history.

(56) References Cited

U.S. PATENT DOCUMENTS

| 3,552,754 | A | * | 1/1971 | Bow | F16J 15/00 16/2.2 |
|---|---|---|---|---|---|
| 4,373,580 | A | * | 2/1983 | Gossalter | F28F 9/0219 165/173 |
| 5,083,372 | A | | 1/1992 | Polutnick et al. | |
| 5,253,810 | A | * | 10/1993 | Maltby | B05B 9/002 239/132.3 |
| 2006/0156730 | A1 | * | 7/2006 | Dinu | F23D 23/00 60/723 |
| 2010/0186413 | A1 | | 7/2010 | Lacy et al. | |
| 2013/0036743 | A1 | | 2/2013 | Khan et al. | |
| 2013/0192234 | A1 | | 8/2013 | Stewart et al. | |
| 2013/0318975 | A1 | * | 12/2013 | Stoia | F23R 3/283 60/737 |

OTHER PUBLICATIONS

U.S. Appl. No. 13/423,894, filed Mar. 19, 2012, Westmoreland, et al.
U.S. Appl. No. 13/908,050, filed Jun. 3, 2013, Fadde, et al.
U.S. Appl. No. 13/471,488, filed May 15, 2012, Keener, et al.

* cited by examiner

*Primary Examiner* — Ehud Gartenberg
*Assistant Examiner* — Filippo Manfredi
(74) *Attorney, Agent, or Firm* — Sutherland Asbill & Brennan LLP

(57) ABSTRACT

The present application provides a fuel plenum for a micro-mixer combustor. The fuel plenum may include a first assembly plate with a first assembly plate aperture, a second assembly plate with a second assembly plate aperture, a fuel tube extending through the first assembly plate aperture of the first assembly plate and the second assembly plate aperture of the second assembly plate, and an installation insert positioned between the fuel tube and the first assembly plate aperture.

13 Claims, 6 Drawing Sheets

US 9,528,703 B2

MICRO-MIXER FUEL PLENUM AND METHODS FOR FUEL TUBE INSTALLATION

TECHNICAL FIELD

The present application and the resultant patent relate generally to gas turbine engines and more particularly relate to a fuel plenum for a micro-mixer combustor and methods for installing fuel tubes therein with relaxed tolerances and an improved lifetime.

BACKGROUND OF THE INVENTION

Operational efficiency and output of a gas turbine engine generally increases as the temperature of the hot combustion gas stream increases. High combustion gas stream temperatures, however, may produce higher levels of nitrogen oxides ($NO_x$) and other types of regulated emissions. A balancing act thus exists between operating a gas turbine engine in an efficient temperature range while also ensuring that the output of nitrogen oxides and other types of regulated emissions remain below mandated levels. Lower emission levels of nitrogen oxides and the like may be promoted by providing for good mixing of the fuel stream and the air stream before combustion. Such premixing tends to reduce combustion temperatures and the output of nitrogen oxides. One method of providing such good mixing is through the use of a micro-mixer combustor where the fuel and the air are mixed in a number of micro-mixer tubes positioned within a fuel plenum.

Specifically, a micro-mixer combustor generally includes a fuel plenum with a number of fuel tubes extending through a number of support or assembly plates. Current methods for installing the fuel tubes require precise machining of a number of apertures through the assembly plates. The fuel tubes then may be brazed directly to the assembly plates. Requiring two assembly plates to be prepared and aligned, however, such that the fuel tubes may be brazed properly to both assembly plates may be a manufacturing challenge. This challenge may be further complicated when fuel tube tolerances are taken into account as well as the requirement that not one but multiple fuel tubes must be brazed to a single assembly plate. Such requirements may lead to increased manufacturing costs, stress on the components, and/or inefficient overall operation.

There is thus a desire for an improved micro-mixer fuel plenum and methods for installing fuel tubes therein. Such an improved micro-mixer fuel plenum design may provide fast and efficient fuel tube installation with relaxed overall tolerances.

SUMMARY OF THE INVENTION

The present application and the resultant patent thus provide a fuel plenum for a micro-mixer combustor. The fuel plenum may include a first assembly plate with a first assembly plate aperture, a second assembly plate with a second assembly plate aperture, a fuel tube extending through the first assembly plate aperture of the first assembly plate and the second assembly plate aperture of the second assembly plate, and an installation insert positioned between the fuel tube and the first assembly plate aperture.

The present application and the resultant patent further provide a method of installing a fuel tube into a fuel plenum. The method may include the steps of positioning a first aperture in a first assembly plate, positioning a second aperture in a second assembly plate, extending a fuel tube between the first aperture of the first assembly plate and the second aperture of the second assembly plate, inserting an installation insert between the first aperture of the first assembly plate and the fuel tube, and brazing the installation insert to the fuel tube and/or the first assembly plate.

The present application and the resultant patent further provide a fuel plenum. The fuel plenum may include a first assembly plate with a number of first assembly plate apertures, a second assembly plate with a number of second assembly plate apertures, a number of fuel tubes extending through the first assembly plate apertures of the first assembly plates and the second assembly plate apertures of the second assembly plates, and a number of installation inserts positioned between the fuel tubes and the first assembly plate apertures. The installation inserts may include a circular flange sized to cover one of the first assembly plate apertures.

These and other advantages and improvements of the present application and the resultant patent will become apparent to one of ordinary skill in the art upon review of the following detailed description when taken in conjunction with the several drawings and the appended claims.

DETAILED DESCRIPTION

Figure 1:
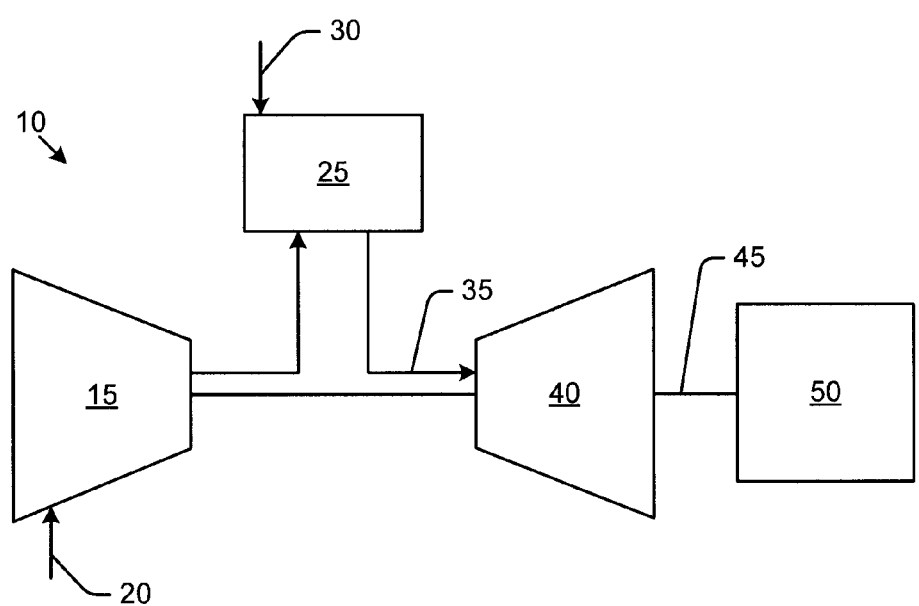
FIG. 1 is a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
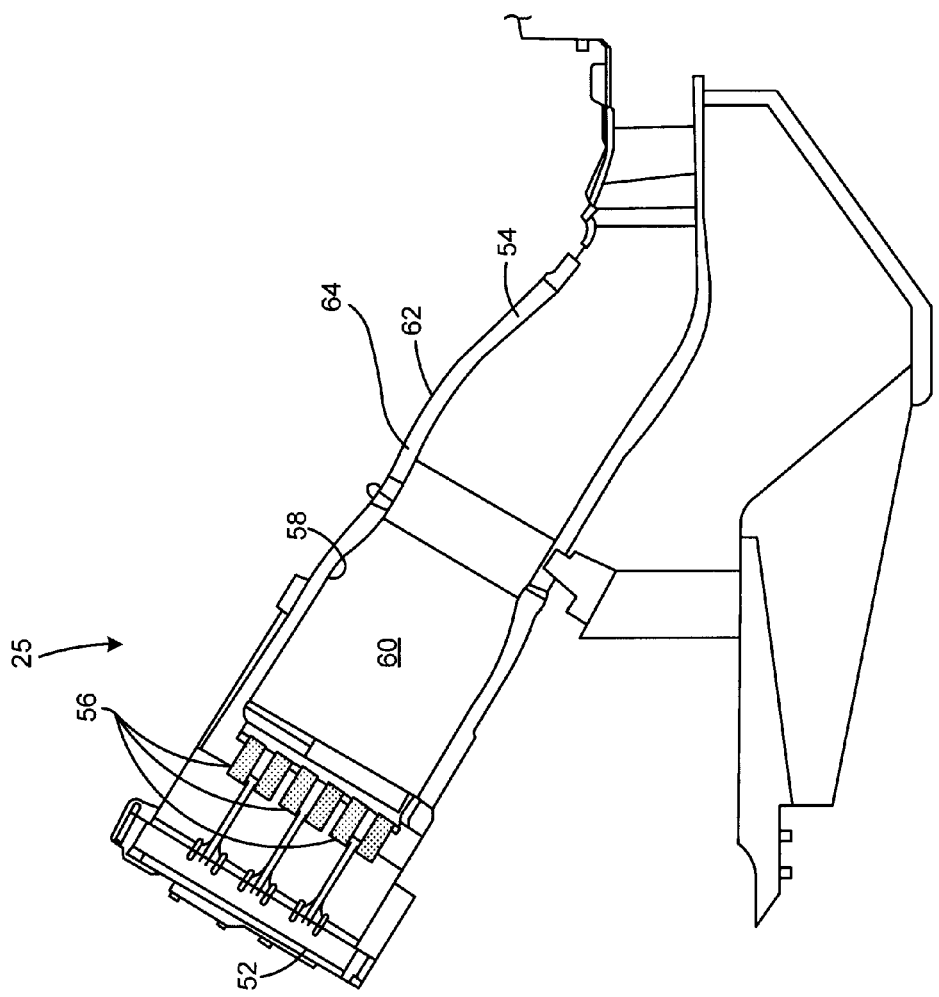
FIG. 2 is a schematic diagram of a combustor as may be used with the gas turbine engine of FIG. 1.
Figure 3:
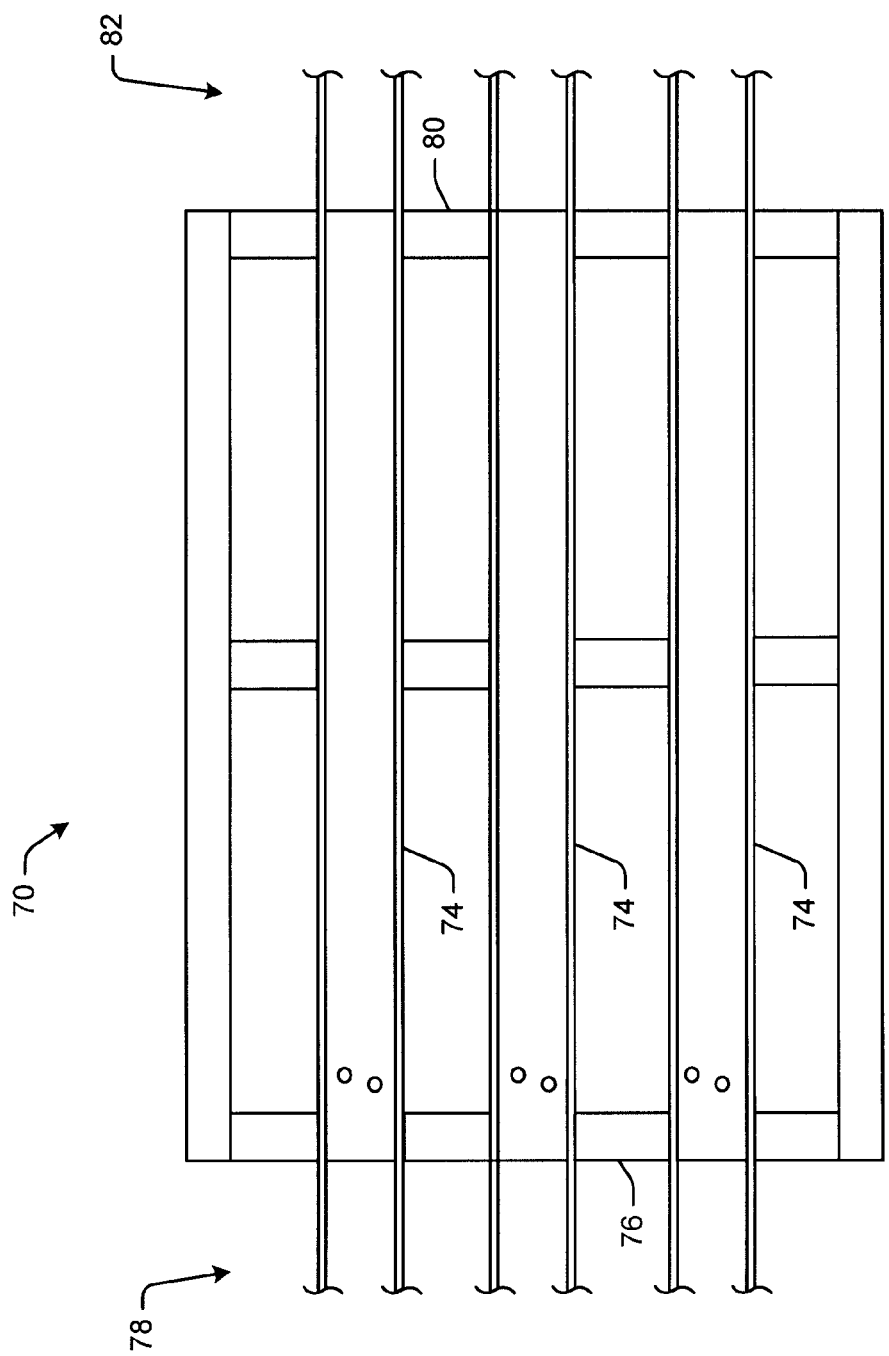
FIG. 3 is a side sectional view of a micro-mixer fuel plenum as may be used with the combustor of FIG. 2.
Figure 4:
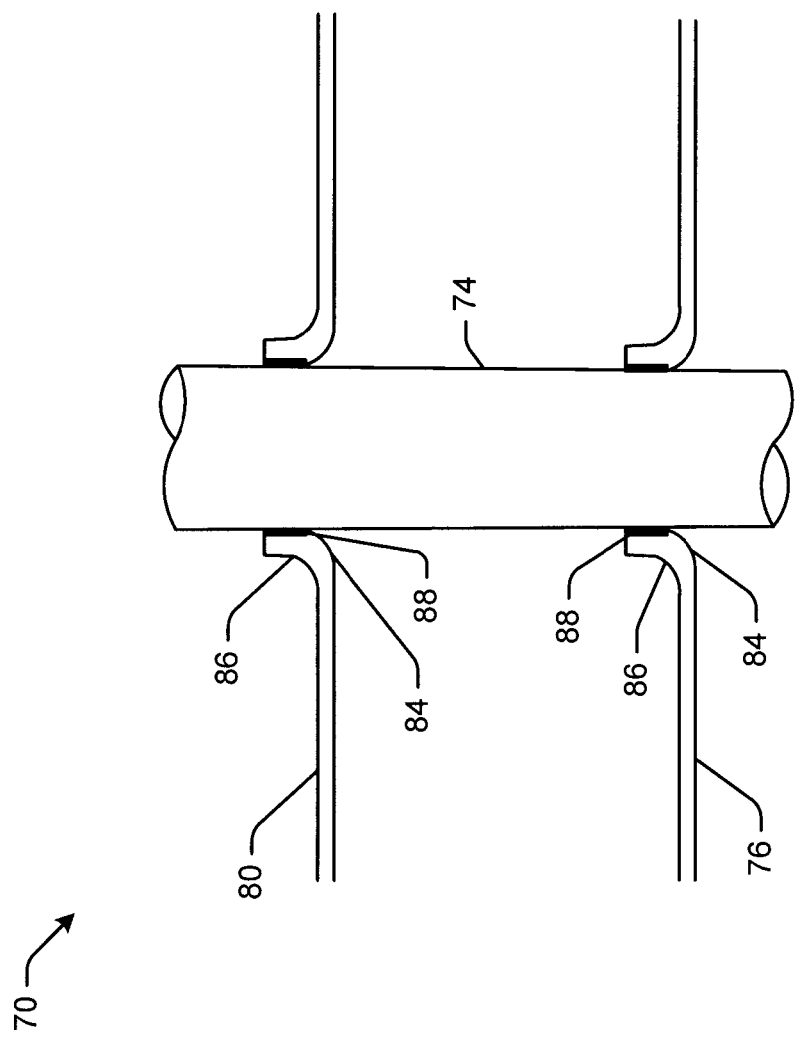
FIG. 4 is a side sectional view of a fuel tube extending through the fuel plenum of FIG. 3.

FIG. 2 shows a schematic diagram of an example of the combustor 25 as may be used with the gas turbine engine 10 described above. The combustor 25 may extend from an end cap 52 at a head end to a transition piece 54 at an aft end about the turbine 40. A number of fuel nozzles 56 may be positioned about the end cap 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. The combustor 25 described herein is for the purpose of example only. Combustors with other components and other configurations may be used herein FIGS. 3 and 4 show an example of a known micro-mixer fuel plenum 70. The micro-mixer fuel plenum 70 may be used about the fuel nozzles 56 or otherwise. The micro-mixer fuel plenum 70 may include a number of fuel tubes 74 therein. The fuel tubes 74 may extend from and through a first support or assembly plate 76 on a first end 78 thereof to and through a second support or assembly plate 80 on a second end 82 thereof. Any number of the fuel tubes 74 may be used herein in varying configurations. Specifically, the fuel tubes 74 and the assembly plates 76, 80 may have any size, shape, or configuration.

As is shown in FIG. 4, current assembly methods require the fuel tubes 74 to be brazed directly to the assembly plates 76, 80. The assembly plates 76, 80 thus include a number of apertures 84 surrounded by a raised braze surface 86. A braze material 88 may be positioned between the fuel tube 74 and the braze surface 86 for the brazing process. The braze material 88 may be conventional. As described above, the process of brazing requires tight tolerances between the surfaces to be attached during the brazing process. Any gaps between the respective components may lead to a leakage therethrough and a reduction in overall efficiency. The micro-mixer fuel plenum 70 described herein is for the purpose of example only. Many other types of micro-mixer fuel plenum designs and components may be used in varying sizes, shapes, or configurations.

Figure 5:
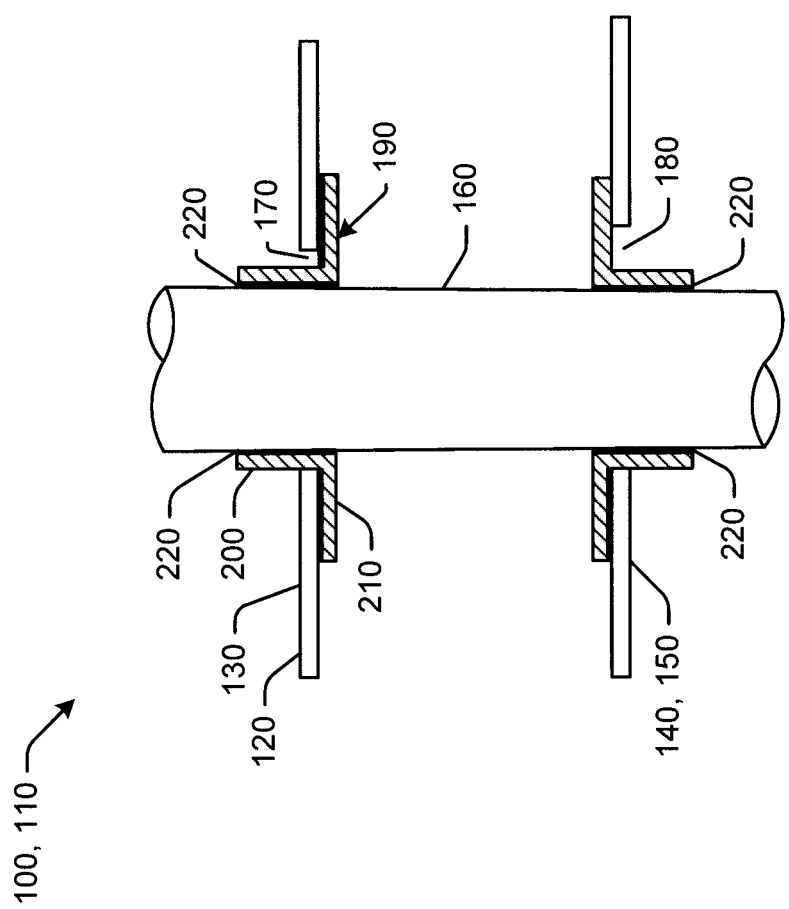
FIG. 5 is a side sectional view of a micro-mixer fuel plenum as may be described herein.

FIG. 5 shows an example of a fuel plenum 100 as may be described herein. The fuel plenum 100 may be a micro-mixer fuel plenum 110. Other types of fuel plenums may be used herein. The fuel plenum 100 may include a first support or assembly plate 120 on a first side 130 thereof and a second support or assembly plate 140 on a second side 150 thereof. Any number of the plates may be used herein. A number of fuel tubes 160 may extend through the first assembly plate 120 and the second assembly plate 140 of the fuel plenum 100. Any number of the fuel tubes 160 may be used herein. The fuel tubes 160 may have any size, shape, or configuration. The fuel tubes 160 may extend through a number of first assembly plate apertures 170 in the first assembly plate 120 and a number of second assembly plate apertures 180 on the second assembly plate 140. Although the assembly plate apertures 170, 180 may be sized for the fuel tubes 160 to pass therethrough, the apertures 170, 180 need not have the same tight tolerances as described above. Given such, the second assembly plate aperture 180 is shown in this example as being larger in diameter than the first assembly plate aperture 170. Neither aperture 170, 180, however, need be as closely tolerance with respect to the fuel tube 160 as compared to the configuration shown in FIG. 4. The apertures 170, 180 thus may have any suitable size, shape, or configuration.

The fuel plenum 100 also may include one or more installation inserts 190. In this example, the installation inserts 190 may include a tube portion 200 and a surrounding circular flange 210. The tube portion 200 and the circular flange 210 may have a substantial "top hat" like configuration. The tube portion 200 may be sized for the respective fuel tube 160 with reasonably corresponding tolerances. The circular flange 210 may extend laterally away from the fuel tube 160 and cover the apertures 170, 180. A braze material 220 may be positioned between the tube portion 200 of the installation insert 190 and the fuel tube 160 and/or between the circular flange 210 and the assembly plates 120, 140. The braze material 220 may secure the fuel tube 160 to the tube portion 200 and the assembly plates 120, 140 to the circular flange 210. The fuel tube 160 outside diameter will be held within the inside diameter of the tube portion 200 of the insulation insert 190. The diameter of the assembly plate apertures 170, 180, however, may have the larger tolerances described above due to the ability of the insulation insert 190 to fill any misalignment. Moreover, the joint formed by the braze material 220 will be placed in compression during thermal growth of the fuel tube 160 so as to extend the expected life of the joint therebetween. Other components and other configurations may be used herein.

Figure 6:
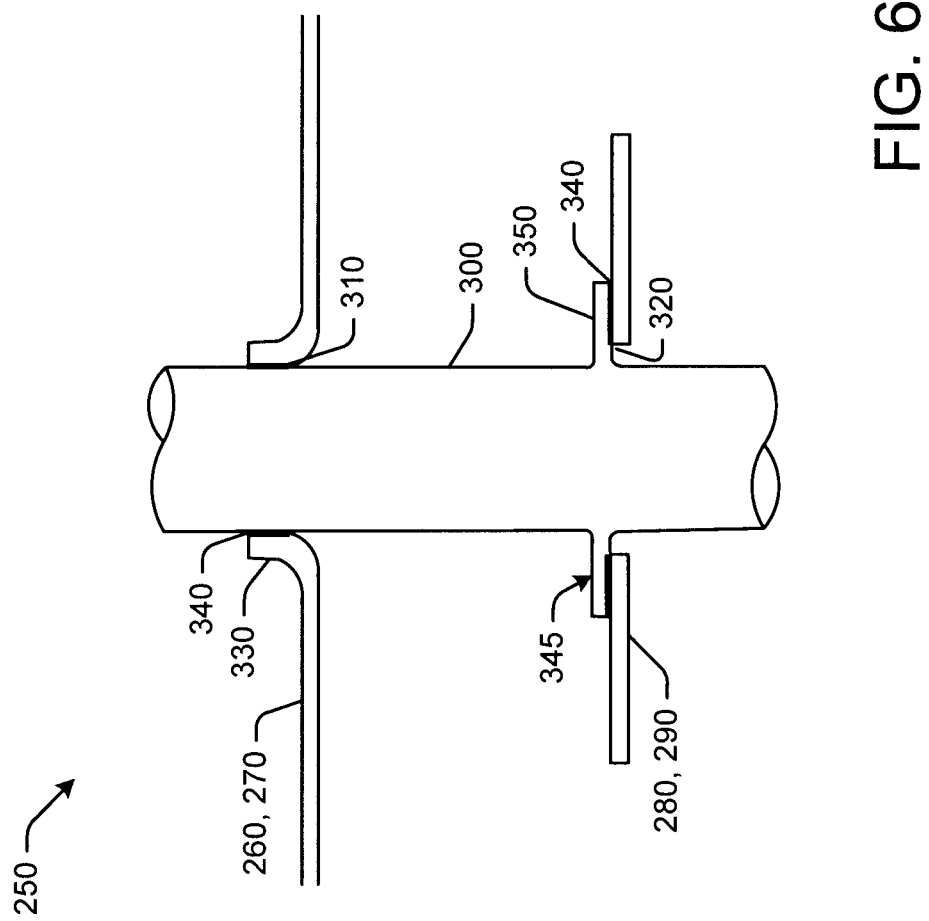
FIG. 6 is a side sectional view of an alternative embodiment of a micro-mixer fuel plenum as may be described herein.

FIG. 6 shows a further embodiment of a fuel plenum 250 as may be described herein. The fuel plenum 250 may have a first support or assembly plate 260 on a first side 270 and a second support or assembly plate 280 on a second side 290 thereof. Any number of the plates may be used herein. A number of fuel tubes 300 may extend through the assembly plates 260, 280. Specifically, the assembly plates 260, 280 may have a first assembly plate aperture 310 and a second assembly plate aperture 320. In this example, the first assembly plate 260 may include a braze surface 330 similar to that described in FIG. 4. An amount of a braze material 340 may be positioned between the braze surface 330 and the fuel tube 300. The second aperture 320 of the second assembly plate 280 may not be as toleranced as the first aperture 310 about the braze surface 330. In this example, the fuel tube 300 may include an installation insert 345 thereon. The installation insert 345 may include a circular flange 350 positioned about the second aperture 320. The circular flange 350 may be brazed to the second assembly plate 280 with an amount of the brazed material 340. The circular flange 350 thus may be used in case of occasional misalignments between the plates 260, 280 or otherwise. Other components and other configurations may be used herein.

The methods and structures shown in FIGS. 5 and 6 may be used independently and/or in combination with one another and/or with the assembly shown in FIG. 4. The fuel plenums thus may have relaxed manufacturing tolerances given the use of the installation inserts. For example, the installation insert may be machined independently of the assembly plates. The inner diameter of the tube portion 200 of the insulation insert 190 may suitably match the outer diameter of the fuel tube 160 so as to provide an optimal gap for brazing. Likewise, the circular flanges 210, 350 also may be brazed to the assembly plates so as to reduce the diameter and the true position of the apertures and the fuel tubes therein. The fuel plenums described herein thus allow for a certain amount of misalignment between the assembly plates. Moreover, the steps described herein allow for a reliable and repeatable method in which the fuel tube brazes may be placed in compression so as to improve the expected life of the brazed joint and thus potentially increase the overall lifetime of the micro-mixer fuel plenum and related components.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A fuel plenum for a micro-mixer combustor, comprising:
   a first assembly plate with a first assembly plate aperture comprising a first diameter;
   a second assembly plate with a second assembly plate aperture comprising a second diameter that is less than the first diameter;
   a fuel tube extending through the first assembly plate aperture of the first assembly plate and the second assembly plate aperture of the second assembly plate;
   a first installation insert positioned between the fuel tube and the first assembly plate aperture, the first installation insert comprising a first circular flange extending from, and attached to, the fuel tube and wherein the first circular flange covers the first assembly plate aperture; and
   a second installation insert positioned between the fuel tube and the second assembly plate aperture, the second installation insert comprising a second circular flange extending from, and attached to, the fuel tube and wherein the second circular flange covers the second assembly plate aperture;
   wherein the first radial portion and the second radial portion are positioned between the first assembly plate and the second assembly plate, such that joints formed by a braze material between the first circular flange and the first assembly plate, and between the second circular flange and the second assembly plate, will be placed in compression during thermal growth of the fuel tube.

2. The fuel plenum of claim 1, wherein the installation insert comprises a tube portion and wherein the tube portion surrounds the fuel tube.

3. The fuel plenum of claim 2, further comprising a braze material between the tube portion and the fuel tube.

4. The fuel plenum of claim 2, wherein the installation insert comprises the circular flange extending from the tube portion.

5. The fuel plenum of claim 4, wherein the tube portion and the circular flange comprise a substantial top hat like configuration.

6. The fuel plenum of claim 1, wherein the second installation insert comprises a tube portion and a circular flange.

7. The fuel plenum of claim 1, wherein second assembly plate comprises a braze surface surrounding the fuel tube.

8. The fuel plenum of claim 7, further comprising a braze material between the braze surface and the fuel tube.

9. A method of installing a fuel tube into a fuel plenum, comprising:
   positioning a first aperture in a first assembly plate comprising a first diameter;
   positioning a second aperture in a second assembly plate comprising a second diameter that is less than the first diameter;
   extending a fuel tube between the first aperture of the first assembly plate and the second aperture of the second assembly plate;
   inserting a first installation insert between the first aperture of the first assembly plate and the fuel tube, such that a first circular flange of the first installation insert is positioned between the first assembly plate and the second assembly plate;
   inserting a second installation insert between the second aperture of the second assembly plate and the fuel tube, such that a second circular flange of the second installation insert is positioned between the first assembly plate and the second assembly plate; and
   brazing the first installation insert and the second installation insert to the fuel tube, brazing the first circular flange to the first assembly plate and brazing the second circular flange to the second assembly plate, such that joints formed by the braze material between the first circular flange and the first assembly plate, and between the second circular flange and the second assembly plate, will be placed in compression during thermal growth of the fuel tube.

10. A fuel plenum, comprising:
    a first assembly plate with a plurality of first assembly plate apertures;
    a second assembly plate with a plurality of second assembly plate apertures;
    a plurality of fuel tubes extending through the first assembly plate apertures of the first assembly plates and the second assembly plate apertures of the second assembly plates; and
    a plurality of installation inserts positioned between the fuel tubes and the first and second assembly plate apertures;
    wherein the installation inserts comprise a circular flange each extending from, and attached to, each of the fuel tubes, each of said circular flanges sized to cover a corresponding of said first and second assembly plate apertures, wherein each of said circular flanges is positioned between the first assembly plate and the second assembly plate, and wherein a joint is formed by a braze material between each circular flange and the corresponding first and second assembly plate apertures, such that the joint will be placed in compression during thermal growth of the fuel tube.

11. The fuel plenum of claim 10, wherein the plurality of first assembly plate apertures comprises a first diameter, wherein the plurality of second assembly plate apertures comprises a second diameter, and wherein the first diameter is larger than the second diameter.

12. The fuel plenum of claim 10, wherein the plurality of installation inserts comprises a tube portion extending from the circular flange.

13. The fuel plenum of claim 10, further comprising a braze material between the circular flange and the fuel tube.

* * * * *